US012283224B2

(12) United States Patent
Iwane et al.

(10) Patent No.: US 12,283,224 B2
(45) Date of Patent: Apr. 22, 2025

(54) SEMICONDUCTOR DEVICE THAT SELECTIVELY SUPPLIES A CONTROL LINE WITH A FIRST DRIVING CAPABILITY OR A SECOND DRIVING CAPABILITY

(71) Applicant: Canon Kabushiki Kaisha, Tokyo (JP)

(72) Inventors: Masaaki Iwane, Kanagawa (JP); Shoji Kono, Tokyo (JP); Shusuke Yanagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 18/155,897

(22) Filed: Jan. 18, 2023

(65) Prior Publication Data

US 2023/0237960 A1    Jul. 27, 2023

(30) Foreign Application Priority Data

Jan. 25, 2022    (JP) .................................. 2022-009442

(51) Int. Cl.
*G09G 3/32* (2016.01)
*H04N 25/74* (2023.01)
*H04N 25/76* (2023.01)

(52) U.S. Cl.
CPC .............. *G09G 3/32* (2013.01); *H04N 25/74* (2023.01); *H04N 25/76* (2023.01); *G09G 2310/0291* (2013.01)

(58) Field of Classification Search
CPC ............. G09G 3/32; G09G 2310/0291; G09G 2330/12; G09G 3/006; H04N 25/74; H04N 25/76; H04N 25/779; H04N 25/69
See application file for complete search history.

(56) References Cited

U.S. PATENT DOCUMENTS

| 10,178,335 | B2* | 1/2019 | Kanehara | H04N 25/75 |
| 10,403,658 | B2* | 9/2019 | Takada | H01L 27/14643 |
| 2010/0309357 | A1 | 12/2010 | Oike | |
| 2013/0235242 | A1 | 9/2013 | Watanabe | |
| 2018/0277578 | A1 | 9/2018 | Takada et al. | |

FOREIGN PATENT DOCUMENTS

| JP | 2005217704 A | 8/2005 |
| JP | 2010283629 A | 12/2010 |
| JP | 2013187607 A | 9/2013 |
| JP | 2018164170 A | 10/2018 |

* cited by examiner

*Primary Examiner* — Ahmed A Berhan
(74) *Attorney, Agent, or Firm* — Venable LLP

(57) ABSTRACT

A semiconductor device including a first buffer circuit and a second buffer circuit each configured to output a control signal to one control line based on an input from a signal output circuit, and an element configured to receive the control signal transmitted through the one control line. The second buffer circuit is switchable between electrical connection and electrical disconnection to the one control line. A first mode in which a current is supplied to the one control line with a first driving capability by the first buffer circuit and a second mode in which a current is supplied to the one control line with a second driving capability greater than the first driving capability by both the first buffer circuit and the second buffer circuit are switchable.

17 Claims, 17 Drawing Sheets

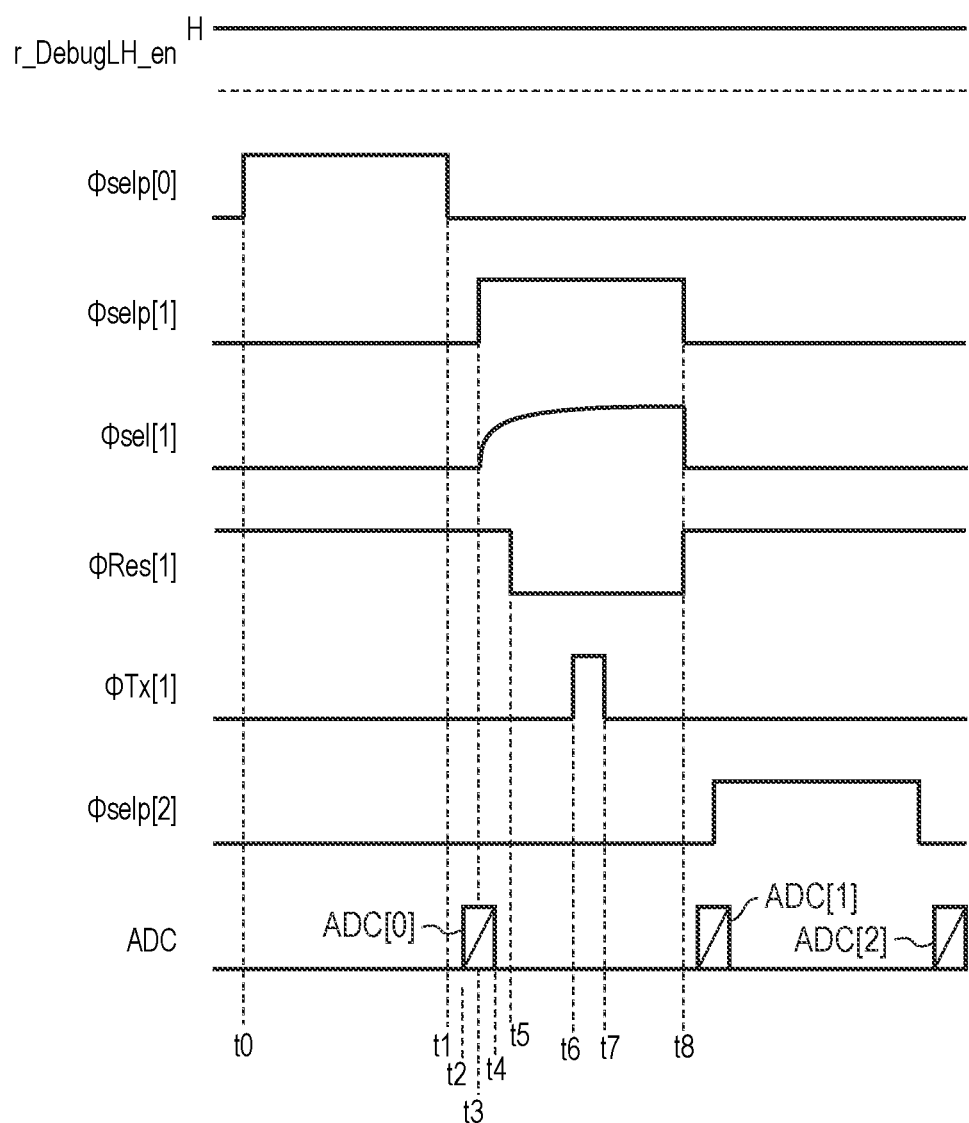

| SETTING | r_DebugLH0_en | r_DebugLH1_en | DRIVING CAPABILITY |
|---|---|---|---|
| S11(default) | 0 | 0 | x16 |
| S12 | 0 | 1 | x15 |
| S13 | 1 | 0 | x1 |

FIG. 7B

| SETTING | r_DebugLH0_en | r_DebugLH1_en | r_DebugLH2_en | DRIVING CAPABILITY |
|---|---|---|---|---|
| S21(default) | 0 | 0 | 0 | x32 |
| S22 | 0 | 0 | 1 | x31 |
| S23 | 0 | 1 | 0 | x25 |
| S24 | 0 | 1 | 1 | x24 |
| S25 | 1 | 0 | 0 | x8 |
| S26 | 1 | 0 | 1 | x7 |
| S27 | 1 | 1 | 0 | x1 |

FIG. 8B

| SETTING | r_DebugLH_en | r_DebugHL_en | L→H | H→L |
|---|---|---|---|---|
| S31(default) | 0 | 0 | FAST | FAST |
| S32 | 1 | 0 | SLOW | FAST |
| S33 | 0 | 1 | FAST | SLOW |
| S34 | 1 | 1 | SLOW | SLOW |

FIG. 9B

| SETTING | r_DebugLH_en | r_DebugHL_en | L→H | H→L |
|---|---|---|---|---|
| S31(default) | 0 | 0 | FAST | FAST |
| S32 | 1 | 0 | SLOW | FAST |
| S33 | 0 | 1 | FAST | SLOW |
| S34 | 1 | 1 | SLOW | SLOW |

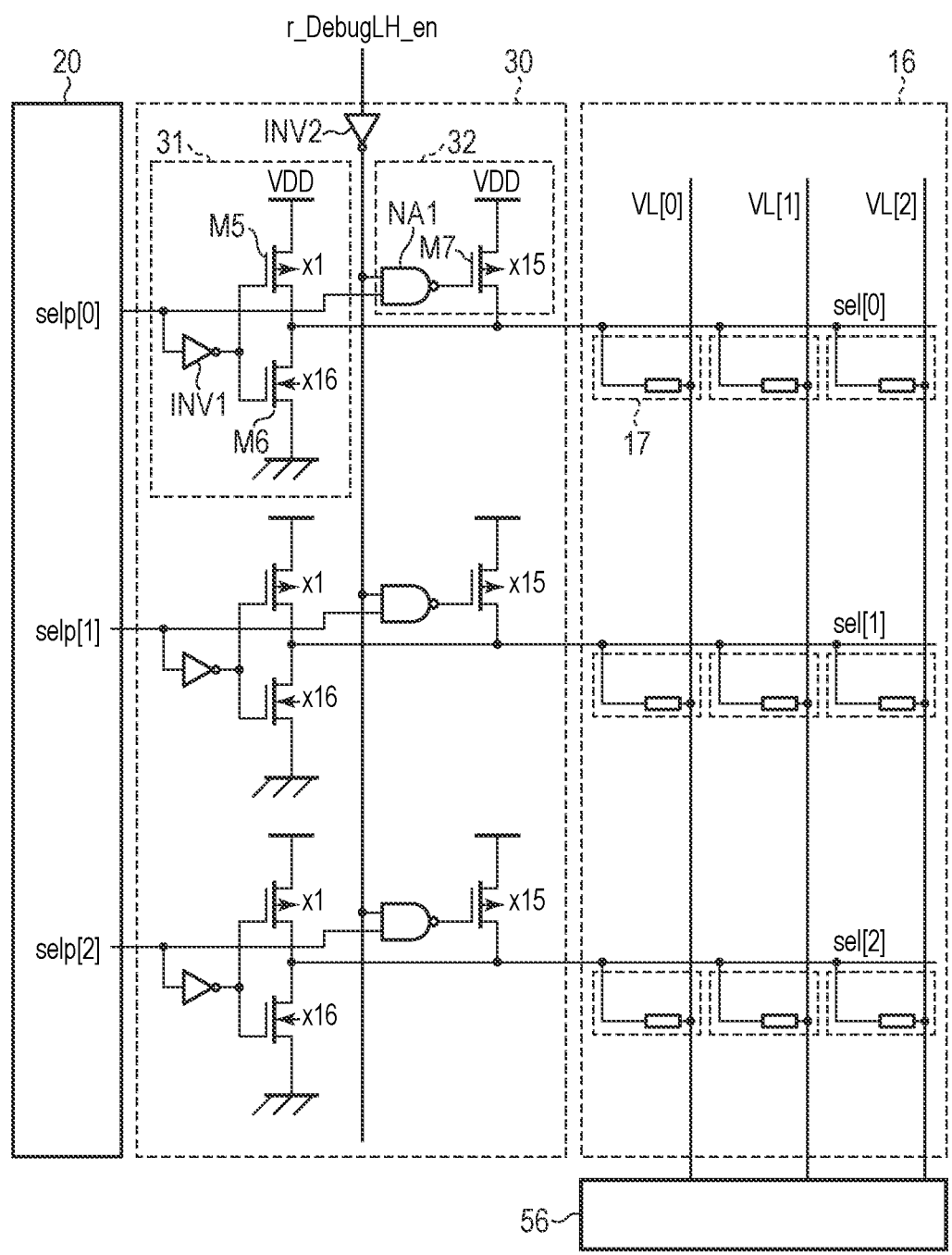

SEMICONDUCTOR DEVICE THAT SELECTIVELY SUPPLIES A CONTROL LINE WITH A FIRST DRIVING CAPABILITY OR A SECOND DRIVING CAPABILITY

BACKGROUND OF THE INVENTION

Field of the Invention

The present disclosure relates to a semiconductor device.

Description of the Related Art

Japanese Patent Application Laid-Open No. 2018-164170 discloses an imaging device including a buffer circuit that outputs a control signal to a plurality of pixels arranged in the same row, and an auxiliary driving circuit that assists driving of the buffer circuit. By providing the auxiliary driver circuit, a difference in timings at which the control signal reaches pixels can be reduced.

Japanese Patent Application Laid-Open No. 2018-164170 discloses that a driving speed of an element is increased by the auxiliary driving circuit. However, Japanese Patent Application Laid-Open No. 2018-164170 does not disclose switching of the driving speed.

SUMMARY OF THE INVENTION

Accordingly, an object of the present disclosure is to provide a semiconductor device capable of switching the driving speed.

According to an embodiment of the disclosure of this specification, there is provided a semiconductor device including a first buffer circuit and a second buffer circuit each configured to output a control signal to one control line based on an input from a signal output circuit, and an element configured to receive the control signal transmitted through the one control line. The second buffer circuit is switchable between electrical connection and electrical disconnection to the one control line. A first mode in which a current is supplied to the one control line with a first driving capability by the first buffer circuit and a second mode in which a current is supplied to the one control line with a second driving capability greater than the first driving capability by both the first buffer circuit and the second buffer circuit are switchable.

Further features of the present invention will become apparent from the following description of exemplary embodiments with reference to the attached drawings.

BRIEF DESCRIPTION OF THE DRAWINGS

FIG. 5 is a timing chart illustrating an operation of the photoelectric conversion device according to the first embodiment.

FIG. 7B is a table illustrating an operation of the buffer circuit group according to the third embodiment.

FIG. 8B is a table illustrating an operation of the buffer circuit group according to the fourth embodiment.

FIG. 9B is a table illustrating an operation of the buffer circuit group according to the fifth embodiment.

FIG. 10 is a diagram illustrating a configuration of a buffer circuit group according to a sixth embodiment.

DESCRIPTION OF THE EMBODIMENTS

Figure 1:
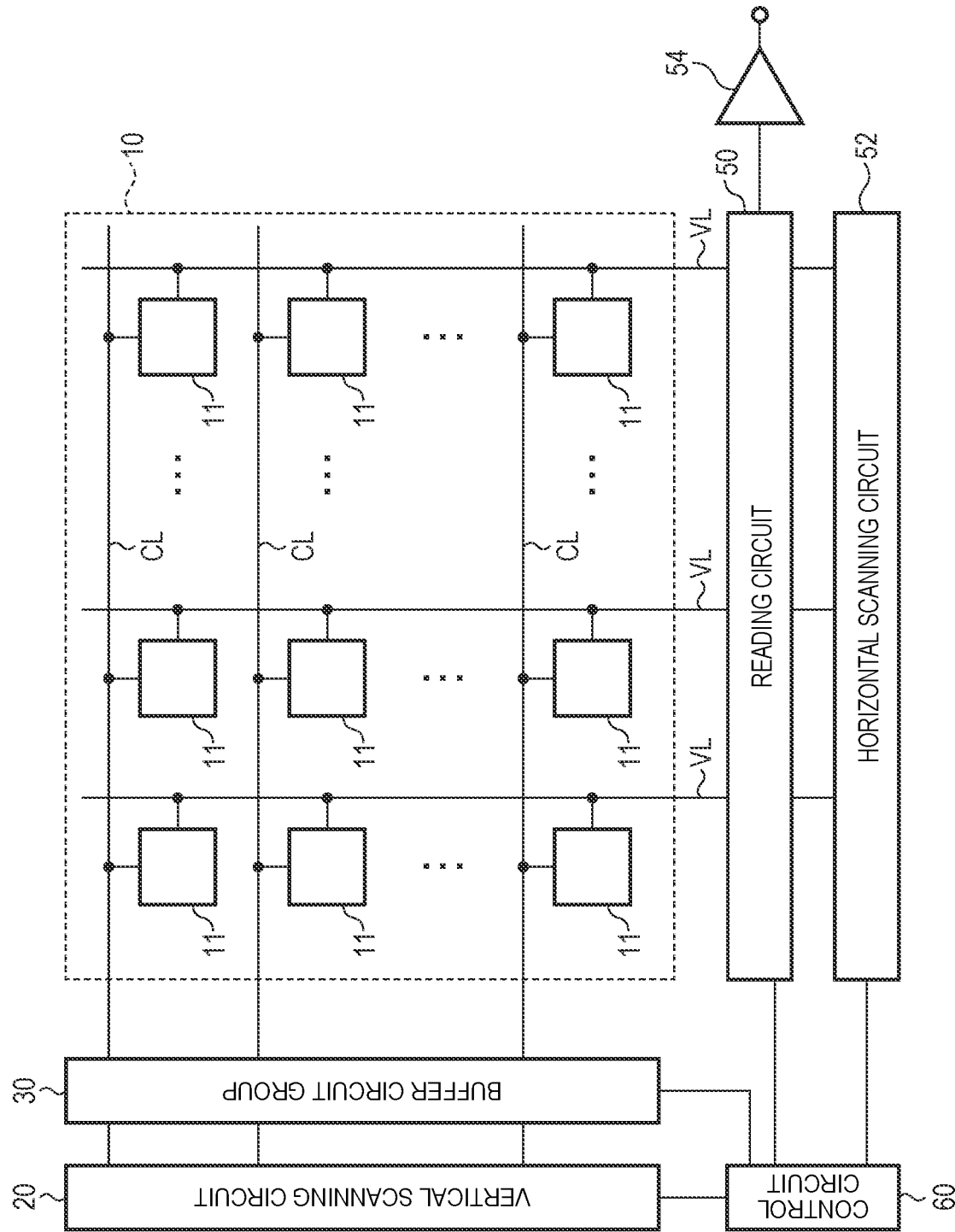
FIG. 1 is a block diagram illustrating a schematic configuration of a photoelectric conversion device according to a first embodiment.

Preferred embodiments of the present invention will now be described in detail in accordance with the accompanying drawings. In the drawings, the same or corresponding elements are denoted by the same reference numerals, and the description thereof may be omitted or simplified.

In the following first to fifth embodiments, an imaging device will be mainly described as an example of a photoelectric conversion device. However, the photoelectric conversion device of each embodiment is not limited to the imaging device, and can be applied to other photodetection devices based on photoelectric conversion. Examples of other photodetection devices include a ranging device and a photometry device. The ranging device may be, for example, a focus detection device, a distance measuring device using a time-of-flight (TOF), or the like. The photometry device may be a device for measuring the amount of light incident on the device. Further, the photoelectric conversion device may be generally referred to as a semiconductor device.

First Embodiment

FIG. 1 is a block diagram illustrating a schematic configuration of a photoelectric conversion device according to the present embodiment. The photoelectric conversion device of the present embodiment includes a pixel array 10, a vertical scanning circuit 20, a buffer circuit group 30, a reading circuit 50, a horizontal scanning circuit 52, an output circuit 54, and a control circuit 60. The circuit constituting the photoelectric conversion device may be formed in one or a plurality of semiconductor substrates.

The pixel array 10 includes a plurality of pixels 11 arranged in a plurality of rows and a plurality of columns. Each of the plurality of pixels 11 is an element that generates charges by photoelectrically converting incident light and outputs a signal corresponding to the incident light. A microlens and a color filter may be arranged on the pixel 11. In FIG. 1, only three rows and three columns of pixels 11 are illustrated, but in practice, the pixels 11 may be arranged in several thousands of rows and several thousands of columns.

In each row of the pixel array 10, a plurality of control lines CL are arranged so as to extend in the first direction (the lateral direction in FIG. 1). Each of the plurality of control lines CL is connected to the pixels 11 arranged in the first direction, and serves as a common signal line for the pixels 11. The first direction in which the control lines CL extend may be referred to as a row direction or a horizontal direction. The control lines CL are connected to the buffer circuit group 30.

In each column of the pixel array 10, vertical signal lines VL are arranged so as to extend in a second direction (vertical direction in FIG. 1) intersecting with the first direction. Each of the vertical signal lines VL is connected to the pixels 11 arranged in the second direction, and serves as a common signal line for the pixels 11. The second direction in which the vertical signal lines VL extend may be referred to as a column direction or a vertical direction. Each of the vertical signal lines VL is connected to a reading circuit 50 and a current source 12 described later in FIG. 2.

The control circuit 60 outputs control signals such as a vertical synchronization signal, a horizontal synchronization signal, and a clock signal to the vertical scanning circuit 20, the buffer circuit group 30, the reading circuit 50, and the horizontal scanning circuit 52. Thus, the control circuit 60 controls the operation of these circuits.

The vertical scanning circuit 20 is a signal output circuit including logic circuits such as a shift register and a gate circuit. The vertical scanning circuit 20 outputs a control signal to the pixel 11 via the buffer circuit group 30 and the control line CL based on a vertical synchronization signal, a horizontal synchronization signal, a clock signal, and the like, and sequentially outputs signals from the pixel 11 on a row basis. The vertical scanning circuit 20 controls a charge accumulation period in the pixel 11.

The buffer circuit group 30 includes a plurality of buffer circuits that buffer the control signals output from the vertical scanning circuit 20 and output them to the control line CL. The detailed configuration of the buffer circuit group 30 will be described later.

The signal generated by the pixel 11 is output to the reading circuit 50 via the vertical signal line VL of the corresponding column. The reading circuit 50 includes column circuits corresponding to respective columns. The column circuit includes an analog memory, an amplifier circuit, an analog-to-digital conversion circuit (AD conversion circuit), a digital memory, and the like. The column circuit performs processing such as amplification and AD conversion on a signal input through the vertical signal line VL, and holds the processed signal for each column.

The horizontal scanning circuit 52 is a scanning circuit including logic circuits such as a shift register, a gate circuit, and a buffer circuit. The horizontal scanning circuit 52 sequentially selects a plurality of column circuits of the reading circuit 50. Thus, each of the plurality of column circuits sequentially outputs the held signals to the output circuit 54. The output circuit 54 outputs a signal in a predetermined format to the outside of the photoelectric conversion device.

Figure 2:
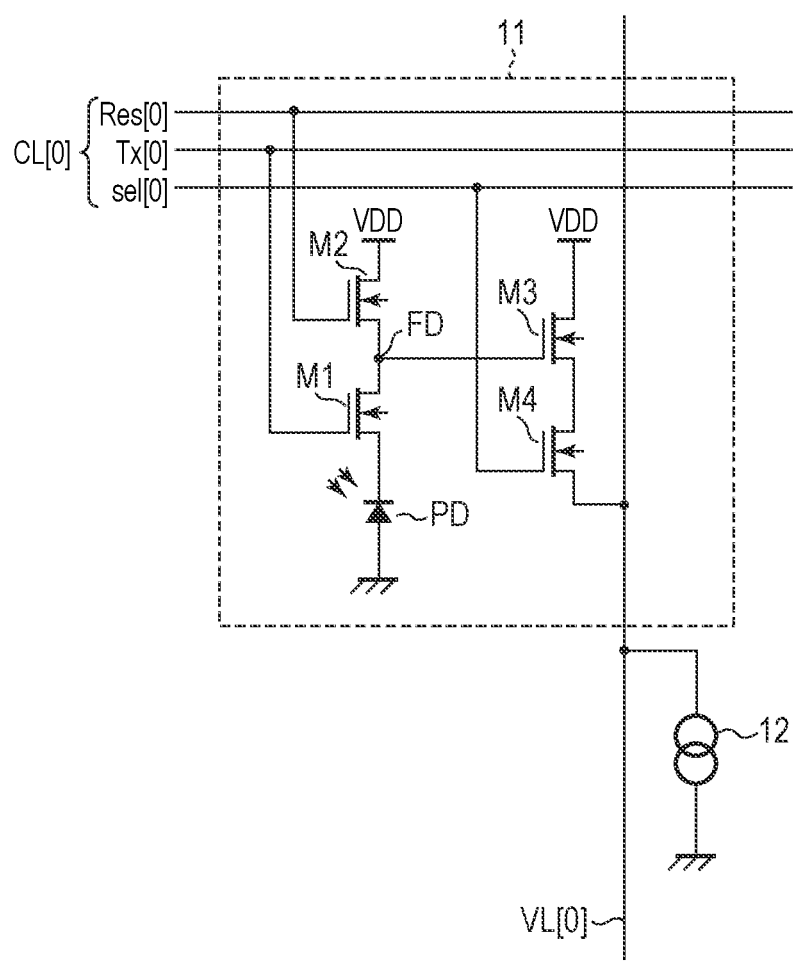
FIG. 2 is a circuit diagram of a pixel according to the first embodiment.

FIG. 2 is a circuit diagram of the pixel 11 according to the present embodiment. FIG. 2 illustrates one pixel 11 in the pixel array 10. In the following description, when an index is attached to the end of a reference numeral in a format such as "VL[0]", this index indicates a row number or a column number. When a row or a column needs to be distinguished for explanation, an index may be attached to a reference numeral in this format, and when a row or a column need not be distinguished, an index may be omitted. It is assumed that the pixels 11 illustrated in FIG. 2 are the pixels 11 in the zeroth row and the zeroth column.

In the following description, it is assumed that charges accumulated in a photoelectric conversion unit in the pixel 11 are electrons. All the transistors included in the pixel 11 are n-channel MOS transistors (hereinafter abbreviated as nMOS transistors). However, the charges accumulated in the photoelectric conversion unit may be holes, and in this case, the transistors of the pixel 11 may be p-channel MOS transistors (hereinafter abbreviated as pMOS transistors). That is, the conductivity type of the transistor or the like can be changed as appropriate depending on the polarity of charge handled as a signal. Further, one of the n-channel type and the p-channel type may be referred to as a first conductivity type, and the other may be referred to as a second conductivity type.

The pixel 11 includes a photoelectric conversion unit PD, a transfer transistor M1, a reset transistor M2, an amplification transistor M3, and a selection transistor M4. The photoelectric conversion unit PD is, for example, a photodiode. The anode of the photoelectric conversion unit PD is connected to a ground node, and the cathode of the photoelectric conversion unit PD is connected to the source of the transfer transistor M1. The drain of the transfer transistor M1 is connected to the source of the reset transistor M2 and the gate of the amplification transistor M3. A node to which the drain of the transfer transistor M1, the source of the reset transistor M2, and the gate of the amplification transistor M3 are connected is a floating diffusion portion FD. The floating diffusion portion FD has a capacitance component (floating diffusion capacitance) and functions as a charge holding portion. The floating diffusion capacitance includes parasitic capacitance in an electrical path from the transfer transistor M1 to the amplification transistor M3 via the floating diffusion portion FD.

The drain of the reset transistor M2 and the drain of the amplification transistor M3 are connected to a power supply voltage node to which a voltage VDD is supplied. The source of the amplification transistor M3 is connected to the drain of the selection transistor M4. The source of the selection transistor M4 is connected to the vertical signal line VL.

A current source 12 is connected to the vertical signal line VL. The current source 12 may be a current source whose current value can be switched or a constant current source whose current value is constant.

The control line CL[0] of the zeroth row includes a control line Tx[0] connected to the gate of the transfer transistor M1, a control line Res[0] connected to the gate of the reset transistor M2, and a control line sel [0] connected to the gate of the selection transistor M4. A control signal φTx is supplied from the vertical scanning circuit 20 to the gate of the transfer transistor M1 via the buffer circuit group 30. A control signal φRes is supplied from the vertical scanning circuit 20 to the gate of the reset transistor M2 via the buffer circuit group 30. A control signal φsel is supplied from the vertical scanning circuit 20 to the gate of the selection transistor M4 via the buffer circuit group 30. A plurality of pixels 11 in the same row are connected to a common control line, and are controlled at the same time by a common control signal.

In the present embodiment, each transistor constituting the pixel 11 is an n-channel MOS transistor. Therefore, when a high-level control signal is supplied from the vertical scanning circuit 20, the corresponding transistor is turned on. When a low-level control signal is supplied from the vertical scanning circuit 20, the corresponding transistor is turned off. The term "source" or "drain" of the MOS transistor may vary depending on the conductivity type of the transistor or the function of interest. Some or all of names of a source and a drain used in this embodiment are sometimes referred to by opposite names.

The photoelectric conversion unit PD converts (photoelectrically converts) incident light into electric charges of an amount corresponding to the amount of the incident light. The transfer transistor M1 is turned on to transfer charges held in the photoelectric conversion unit PD to the floating diffusion portion FD. The charges transferred from the photoelectric conversion unit PD are held in the capacitance (floating diffusion capacitance) of the floating diffusion portion FD. As a result, the floating diffusion portion FD has a potential corresponding to the amount of charges transferred from the photoelectric conversion unit PD by charge-to-voltage conversion by the floating diffusion capacitance.

The selection transistor M4 is turned on to connect the amplification transistor M3 to the vertical signal line VL. The amplification transistor M3 is configured such that a voltage VDD is supplied to the drain and a bias current is supplied from the current source 12 to the source via the selection transistor M4, and constitutes an amplification unit (source follower circuit) having a gate as an input node. Accordingly, the amplification transistor M3 outputs a signal based on the potential of the floating diffusion portion FD to the vertical signal line VL via the selection transistor M4. In this sense, the amplification transistor M3 and the selection transistor M4 are output units that output pixel signals corresponding to the amount of charges held in the floating diffusion portion FD.

The reset transistor M2 has a function of resetting the floating diffusion portion FD by controlling supply of a voltage (voltage VDD) to the floating diffusion portion FD. When the reset transistor M2 is turned on, the floating diffusion portion FD is reset to a voltage corresponding to the voltage VDD.

Although FIG. 2 illustrates a configuration in which a signal is output to the corresponding vertical signal line VL through one selection transistor M4, the configuration of the selection transistor M4 and the vertical signal line VL is not limited thereto. For example, in a configuration in which a plurality of selection transistors M4 and a plurality of vertical signal lines VL are arranged for one pixel 11, a configuration in which a vertical signal line VL for outputting a signal can be selected by individually controlling the plurality of selection transistors M4 may be adopted.

Figure 3:
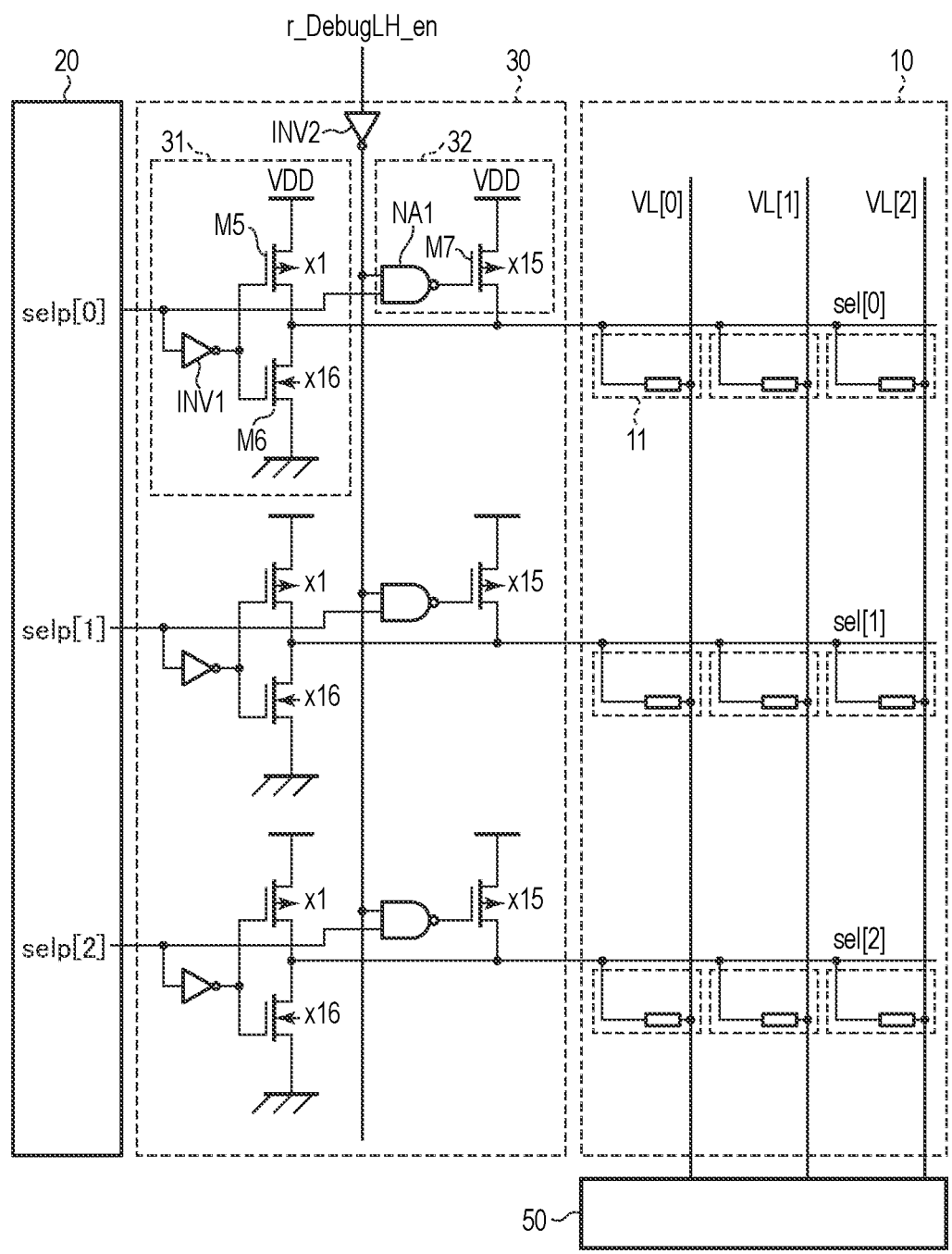
FIG. 3 is a circuit diagram illustrating a more detailed configuration of a buffer circuit group according to the first embodiment.

FIG. 3 is a circuit diagram illustrating a more detailed configuration of the buffer circuit group 30 according to the present embodiment. FIG. 3 illustrates the pixel array 10, the vertical scanning circuit 20, and the reading circuit 50 as the circuits around the buffer circuit group 30, and the other elements are omitted. In FIG. 3, three rows and three columns in the zeroth row to the second row and in the zeroth column to the second column are extracted. FIG. 3 illustrates only the control line se1 among the control lines CL, and the control lines Tx and Res are omitted. Between the vertical scanning circuit 20 and the buffer circuit group 30, control lines se1p[0], se1p[1], and se1p[2] for transmitting control signals for controlling the selection transistor M4 are arranged corresponding to respective rows.

The buffer circuit group 30 includes a plurality of first buffer circuits 31, a plurality of second buffer circuits 32, and an inverter circuit INV2. Each of the first buffer circuit 31 and the second buffer circuit 32 is disposed for corresponding row of the pixel array 10. One first buffer circuit 31 and one second buffer circuit 32 are connected to one corresponding control line se1[n] (n is an integer equal to or greater than 0).

The first buffer circuit 31 and the second buffer circuit 32 of the zeroth row will be described. Since the first row and the second row are the same as those of the zeroth row, description thereof is omitted. The first buffer circuit 31 includes a pMOS transistor M5 (second MOS transistor), an nMOS transistor M6 (third MOS transistor), and an inverter circuit INV1. The second buffer circuit 32 includes a pMOS transistor M7 (first MOS transistor) and a NAND circuit NA1.

The control line se1p[0] is connected to an input terminal of the inverter circuit INV1. An output terminal of the inverter circuit INV1 is connected to the gate of the pMOS transistor M5 and the gate of the nMOS transistor M6. The source (second main electrode) of the pMOS transistor M5 is connected to a power supply voltage node to which the voltage VDD is supplied. The source (second main electrode) of the nMOS transistor M6 is connected to a ground node. The drain (first main electrode) of the pMOS transistor M5 and the drain (first main electrode) of the nMOS transistor M6 are connected to the control line se1 [0].

The control line se1p[0] is connected to a first input terminal of the NAND circuit NA1. A register value r_DebugT_H_en is input from the control circuit 60 to an input terminal of the inverter circuit INV2. An output terminal of the inverter circuit INV2 is connected to a second input terminal of the NAND circuit NA1. An output terminal of the NAND circuit NA1 is connected to the gate of the pMOS transistor M7. The source (second main electrode) of the pMOS transistor M7 is connected to a power supply voltage node to which the voltage VDD is supplied. The drain (first main electrode) of the pMOS transistor M7 is connected to the control line se1 [0]. The control line se1 [0] is connected to a plurality of pixels 11 arranged in the zeroth row.

In FIG. 3, the symbols "x1", "x15" and "x16" illustrated in the vicinity of each transistor indicate the ratio of a driving capability of each transistor to a reference value of the driving capability. The driving capability is a magnitude of a capability of supplying a current for transmitting a control signal from each transistor to a control line. The driving capability varies depending on the design of the channel width or the like of the transistor.

The reference value of the driving capability indicates the driving capabilities of the pMOS transistor and the nMOS transistor such that the duty of the input pulse and the duty of the output pulse are the same in an inverter circuit including the pMOS transistor and the nMOS transistor. The channel width of the pMOS transistor at the reference value is two to three times the channel width of the nMOS transistor at the reference value. This is because the carrier mobility in the channel portion of the pMOS transistor is ⅓ to ½ of the carrier mobility in the channel portion of the nMOS transistor. This means that when the pMOS transistor and the nMOS transistor have the same size, the driving capability of the pMOS transistor is ⅓ to ½ of the driving capability of the nMOS transistor. Thus, by appropriately designing the channel width or the like in consideration of the difference in carrier mobility, it is possible to design the driving capability of each transistor to a predetermined value.

As illustrated in FIG. 3, the driving capability of the pMOS transistor M5 is one times the reference value, that is, the same as the reference value. The driving capability of the nMOS transistor M6 is 16 times the reference value. The driving capability of the pMOS transistor M7 is 15 times the reference value. Since the driving capability of the pMOS transistor M5 and the driving capability of the pMOS transistor M7 are different from each other, the amount of change in the driving capability due to switching of the driving capability described later can be increased.

When the register value r_DebugLH_en is at the low level (the second mode), since the input signal of the second input terminal of the NAND circuit NA1 is at the high level, the NAND circuit NA1 functions as an inverter circuit having the first input terminal as an input. In this case, since both the pMOS transistor M5 and the pMOS transistor M7 operate in parallel, the combined driving capability (second driving capability) is 16 times the reference value, so that a balanced configuration is achieved with the driving capability of the nMOS transistor M6.

On the other hand, when the register value r_DebugLH_en is at the high level (first mode), since the input signal of the second input terminal of the NAND circuit NA1 is at the low level, the output signal of the NAND circuit NA1 is fixed at the high level. Thereby, the pMOS transistor M7 is always in the off state. In this case, since the pMOS transistor M7 does not supply a current to the control line sel [0], the driving capability when the potential of the control line sel [0] changes from the low level to the high level is lower than that when the register value r_DebugLH_en is at the low level. More specifically, the driving capability (first driving capability) at this time is one times the reference value. Thus, according to the level of the register value r_DebugLH_en, the electrical connection and electrical disconnection of the pMOS transistor M7 in the second buffer circuit and the control line sel [0] are switchable, thereby changing the driving capability.

Figure 4:
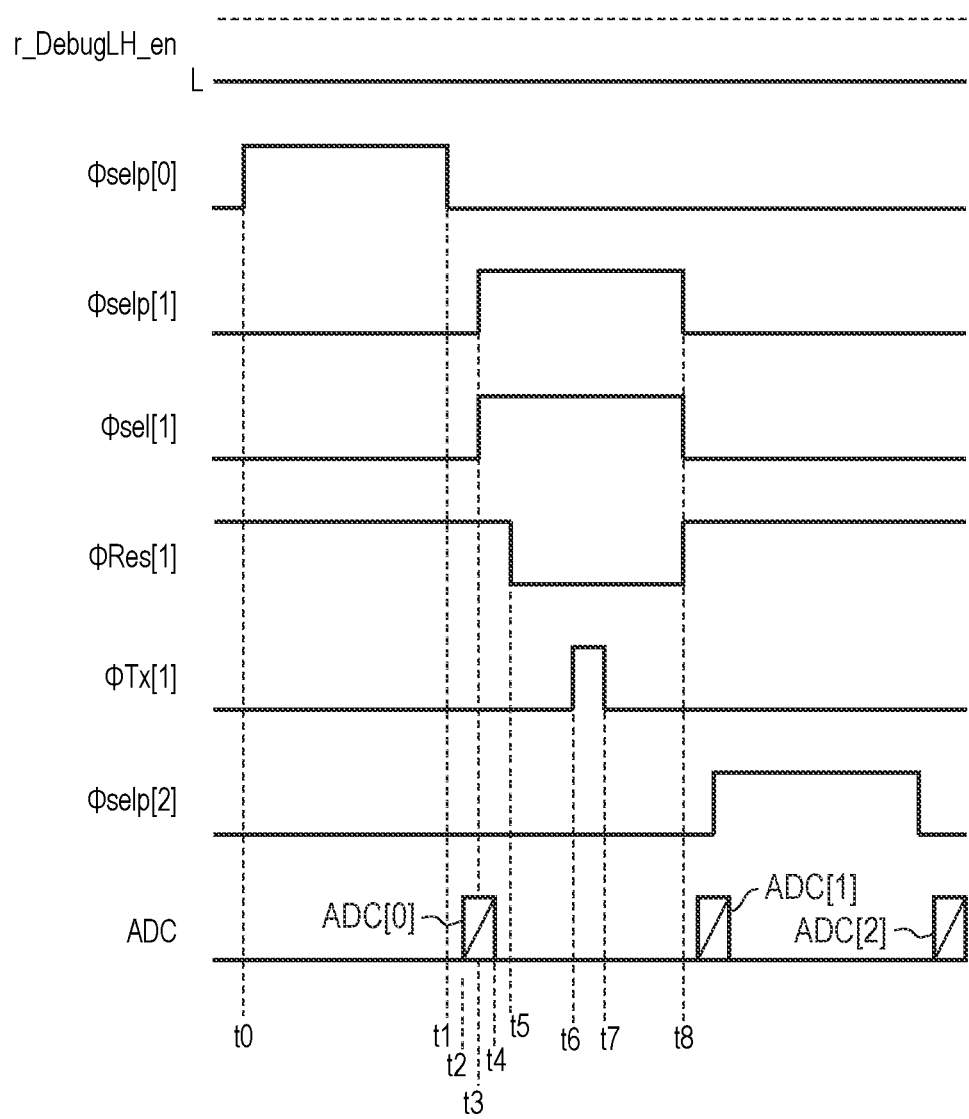
FIG. 4 is a timing chart illustrating an operation of the photoelectric conversion device according to the first embodiment.

FIGS. 4 and 5 are timing charts illustrating an operation of the photoelectric conversion device according to the present embodiment. FIG. 4 is a timing chart when the register value r_DebugLH_en is at the low level, and FIG. 5 is a timing chart when the register value r_DebugLH_en is at the high level.

FIGS. 4 and 5 illustrate operation timings of a control signal φsel p[0] of the zeroth row, control signals φsel p[1], φsel [1], φRes[1], and φTx[1] of the first row, and a control signal φsel p[2] of the second row. Here, the control signals φsel p[0], φsel p[1], and φsel p[2] indicate signals output from the vertical scanning circuit 20 to the control lines sel p[0], sel p[1], and sel p[2], respectively. Further, "ADC" in FIGS. 4 and 5 indicates the timing at which the AD conversion is performed in the reading circuit 50. Boxes "ADC[0]", "ADC[1]", and "ADC[2]" indicate AD conversion periods of output signals from the zeroth row, the first row, and the second row, respectively.

First, the operation of the photoelectric conversion device when the register value r_DebugLH_en is at the low level will be described with reference to FIG. 4.

At time t0, the control signal φsel p[0] changes from the low level to the high level. As a result, the selection transistor M4 of the pixel 11 of the zeroth row is turned on, whereby the zeroth row is selected.

During a period from the time t0 to time t1, pixel signals from the pixels 11 of the zeroth row are output to the reading circuit 50 via the vertical signal lines VL[0], VL[1], and VL[2]. These pixel signals are held in an analog memory in the reading circuit 50.

At the time t1, the control signal φsel p[0] changes from the high level to the low level. As a result, the selection transistor M4 of the pixel 11 of the zeroth row is turned off, whereby the selection of the zeroth row is canceled.

At time t2, the AD conversion circuit in the reading circuit 50 starts AD conversion of the pixel signals of the zeroth row held in the analog memory.

At time t3, the control signal φsel p[1] changes from the low level to the high level. Since the buffer circuit group 30 buffers the control signal φsel p[1] and outputs it as φsel [1], φsel [1] also changes from the low level to the high level. Thus, the selection transistor M4 of the pixel 11 of the first row is turned on, whereby the first row is selected.

At the time t3, the control signal φRes[1] is at the high level, and the reset transistor M2 is on. The control signal φTx[1] is at the low level, and the transfer transistor M1 is off. Therefore, at the time t3, the floating diffusion portion FD of the pixel 11 in the first row is in the reset state.

At time t4, the AD conversion circuit in the reading circuit 50 ends the AD conversion of the pixel signals of the zeroth row held in the analog memory. The converted digital data is held in a digital memory in the reading circuit 50.

At time t5, the control signal φRes[1] changes from the high level to the low level. As a result, the reset transistor M2 is turned off, and the reset of the floating diffusion portion FD of the pixel 11 is canceled to enter the floating state.

At time t6, the control signal φTx[1] changes from the low level to the high level. Thereby, the transfer transistor M1 is turned on. Thereafter, at time t7, φTx[1] changes from the high level to the low level. Thereby, the transfer transistor M1 is turned off. By these operations, the charges accumulated in the pixel 11 is transferred to the floating diffusion portion FD during the period from the time t6 to the time t7.

At time t8, the control signal φRes[1] changes from the low level to the high level, and the reset transistor M2 is turned on. Thus, after the time t8, the potential of the floating diffusion portion FD is reset to a potential corresponding to the voltage VDD.

At time t8, the control signal φsel p[1] changes from the high level to the low level. Since the buffer circuit group 30 buffers the control signal φsel p[1] and outputs it as φsel [1], φsel [1] also changes from the high level to the low level. Thus, the selection transistor M4 of the pixel 11 of the first row is turned off, whereby the selection of the first row is canceled.

During a period from the time t7 to the time t8, the pixel signals from the pixels 11 in the first row are output to the reading circuit 50 via the vertical signal lines VL[0], VL[1], and VL[2]. These pixel signals are held in an analog memory in the reading circuit 50. Since the subsequent steps are the same except that the rows in which the operations are performed are different from each other, the description thereof will be omitted.

The timing chart of FIG. 4 illustrates an operation example when the register value r_DebugLH_en is at the low level, that is, when the driving capability of the buffer circuit group 30 is relatively large. In contrast, with reference to FIG. 5, the operation of the photoelectric conversion device when the register value r_DebugLH_en is at the high level, that is, when the driving capability of the buffer circuit group 30 is less than that in the example of FIG. 4 will be described.

In FIG. 5, portions other than the level of the register value r_DebugLH_en and the control signal φsel [1] are the same as those in FIG. 4. However, since the driving capability of the buffer circuit group 30 is small, the transition speed of the potential when the control signal φsel [1] transitions from the low level to the high level at the time t3 is slow in FIG. 5. The time t3 is a time at which the AD conversion of the pixel signals of the zeroth row is performed. If the transition of the potential of the control signal φse1 [1] is fast at the time of AD conversion, noise due to variation of the power supply potential may affect the accuracy of AD conversion. On the other hand, in the example of FIG. 5, since the transition speed of the potential of the control signal φse1 [1] decreases at the time t3, the variation of the power supply potential decreases. Therefore, by setting the register value r_DebugLH_en to the high level to reduce the driving capability of the buffer circuit group 30, it is possible to reduce the influence of the variation of the power supply potential on the accuracy of the AD conversion.

On the other hand, when the transition speed of the potential when the control signal φse1 [1] transitions from the low level to the high level is reduced, the reading speed of the pixel signal may be reduced. Therefore, when the speed of reading out the pixel signal is required to be increased, it is desirable to set the register value r_DebugLH_en to the low level to increase the transition speed of the control signal φse1 [1]. On the other hand, when the readout of the pixel signal with small noise is required, it is desirable to set the register value r_DebugLH_en to the high level to lower the transition speed of the control signal φse1 [1]. Thus, by changing the level of the register value r_DebugLH_en according to the performance required for the photoelectric conversion device, it is possible to select an appropriate transition speed by switching the driving capability of the buffer circuit group 30. Therefore, according to the present embodiment, a photoelectric conversion device capable of switching the driving speed is provided.

In addition, the switching of the driving speed in the present embodiment can be applied to applications different from those described above. One example of such an application is an enhanced shipping test of a photoelectric conversion device. In the shipping test of the photoelectric conversion device after manufacturing, it is desirable to test the photoelectric conversion device in a state where the register value r_DebugLH_en is set to the high level. In this case, since the driving capability is small and the driving speed is low, the abnormality of the control line se1 can be more significantly detected. Examples of the abnormality of the control line se1 that can be detected by this method include a high-resistance short circuit between the control line se1 and other wirings, and a high resistance in the case where the control line se1 is too narrow due to manufacturing variation. Since the influence of the abnormality including such a high-resistance portion becomes more significant as the driving capability becomes smaller, it is possible to detect the abnormality with higher accuracy by performing the test in a state where the driving capability is small. Thus, by setting the register value r_DebugLH_en to the high level, an enhanced shipping test can be performed. Further, by introducing such an enhanced shipping test, it is possible to find a process abnormality in the mass production process of the photoelectric conversion device early. On the other hand, when the user uses the photoelectric conversion device after shipping the photoelectric conversion device, by setting the register value r_DebugLH_en to the low level, it is possible to speed up the reading of the pixel signals.

Yet another application of switching the driving speed is to analyze the cause of failure of a defective product generated after shipment. For example, it is assumed that there is a defect in which a signal output from a specific row indicates an abnormal value when only a part of the pixel array 10 is irradiated with light. In this case, if the defect becomes significant when the register value r_DebugLH_en is set to the high level as compared with the case where the register value r_DebugLH_en is set to the low level, it can be determined that the defect is likely caused by the control line se1.

In the buffer circuit group 30 of the present embodiment, a configuration in which the driving capability of the control line se1 can be switched is applied, but the present embodiment is not limited thereto, and a configuration in which the driving capability of the control line Res or the control line Tx can be switched may be used. However, since the area occupied by the selection transistor M4 in the substrate is often small, and the wiring associated with the selection transistor M4 tends to cause an abnormality such as a high-resistance short circuit, it is desirable that the driving capability of the control line se1 be switched.

In this embodiment, the source of the pMOS transistor M5 and the source of the pMOS transistor M7 are both connected to the power supply voltage node to which the voltage VDD is supplied. That is, the source of the pMOS transistor M5 and the source of the pMOS transistor M7 are electrically connected, and the pMOS transistor M5 and the pMOS transistor M7 are not cascode-connected. Therefore, the pMOS transistor M5 and the pMOS transistor M7 can provide a large driving capability to the control line se1 with a small occupied area.

In the present embodiment, an example in which the driving capability can be switched to two values of one times and 16 times the reference value is explained, but the values of the two driving capabilities are not limited to this example, and the effect of the present embodiment can be obtained if the two values are different from each other. However, in order to obtain sufficient effects in applications such as noise reduction of AD conversion, an enhanced shipping test, and defect cause analysis, it is desirable that the ratio of the values of the two driving capabilities be 10 times or more.

Second Embodiment

The photoelectric conversion device according to the present embodiment will be described. Components similar to those in the first embodiment are denoted by the same reference numerals, and descriptions of these components may be omitted or simplified.

Figures 6A, 6B:
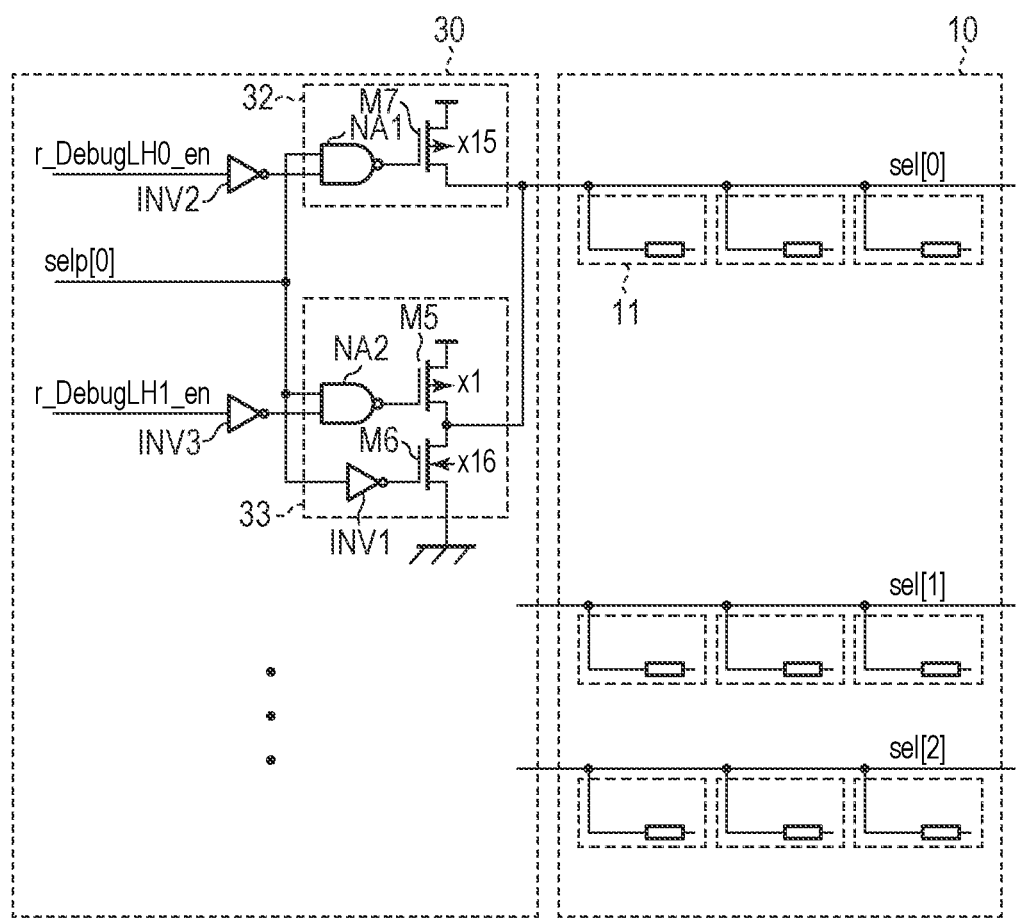
FIG. 6A is a diagram illustrating a configuration of a buffer circuit group according to a second embodiment.
FIG. 6B is a table illustrating an operation of the buffer circuit group according to the second embodiment.

FIG. 6A is a circuit diagram illustrating a configuration of the buffer circuit group 30 according to the present embodiment. FIG. 6A illustrates the pixel array 10 as a circuit around the buffer circuit group 30, and the other elements are omitted. In FIG. 6A, the configuration of the zeroth row is mainly extracted and illustrated, and the other rows are omitted or simplified.

The buffer circuit group 30 includes a first buffer circuit 33, a second buffer circuit 32, and inverter circuits INV2 and INV3 as elements corresponding to the zeroth row. The first buffer circuit 33 includes a pMOS transistor M5, an nMOS transistor M6, an inverter circuit INV1, and a NAND circuit NA2. The second buffer circuit 32 includes a pMOS transistor M7 and a NAND circuit NA1.

The control line se1p[0] is connected to an input terminal of the inverter circuit INV1 and a first input terminal of the NAND circuit NA2. An output terminal of the inverter circuit INV1 is connected to the gate of the nMOS transistor M6. A register value r_DebugLH1_en is input from the control circuit 60 to an input terminal of the inverter circuit INV3. An output terminal of the inverter circuit INV3 is connected to a second input terminal of the NAND circuit NA2. An output terminal of the NAND circuit NA2 is connected to the gate of the pMOS transistor M5. The source of the pMOS transistor M5 is connected to a power supply voltage node to which the voltage VDD is supplied. The source of the nMOS transistor M6 is connected to a ground node. The drain of the pMOS transistor M5 and the drain of the nMOS transistor M6 are connected to the control line sel [0].

The control line se1p[0] is also connected to a first input terminal of the NAND circuit NA1. A register value r_DebugLH0_en is input from the control circuit 60 to an input terminal of the inverter circuit INV2. An output terminal of the inverter circuit INV2 is connected to a second input terminal of the NAND circuit NA1. An output terminal of the NAND circuit NA1 is connected to the gate of the pMOS transistor M7. The source of the pMOS transistor M7 is connected to a power supply voltage node to which the voltage VDD is supplied. The drain of the pMOS transistor M7 is connected to the control line sel [0]. The control line se1 [0] is connected to a plurality of pixels 11 arranged in the zeroth row.

As illustrated in FIG. 6A, the driving capability of the pMOS transistor M5 is one times the reference value, that is, the same as the reference value. The driving capability of the nMOS transistor M6 is 16 times the reference value. The driving capability of the pMOS transistor M7 is 15 times the reference value.

FIG. 6B is a table illustrating operation settings of the buffer circuit group 30 of the present embodiment. FIG. 6B illustrates the levels of the register values r_DebugLH0_en and r_DebugLH1_en and the driving capabilities in the three settings S11, S12, and S13. "0" in the columns of register values r_DebugLH0_en and r_DebugLH1_en indicates the low level, and "1" indicates the high level.

The setting S11 illustrated in FIG. 6B is a default setting, and both the register values r_DebugLH0_en and r_DebugLH1_en are at the low level. Since the input signals of the second input terminals of the NAND circuits NA1 and NA2 are both at the high level, both of the NAND circuits NA1 and NA2 function as an inverter circuit having the first input terminal as an input. In this case, since both the pMOS transistor M5 and the pMOS transistor M7 operate in parallel, the combined driving capability is 16 times the reference value.

The setting S12 illustrated in FIG. 6B is a setting in which the driving capability is slightly smaller than the setting S11. At this time, the register value r_DebugLH0_en is at the low level, and the register value r_DebugLH1_en is at the high level. Since the input signal of the second input terminal of the NAND circuit NA1 is at the high level, the NAND circuit NA1 functions as an inverter circuit having the first input terminal as an input. Since the input signal of the second input terminal of the NAND circuit NA2 is at the low level, the output signal of the NAND circuit NA2 is fixed at the high level. In this case, since only the pMOS transistor M7 operates, the driving capability is 15 times the reference value.

The setting S13 illustrated in FIG. 6B is the setting with the smallest driving capability. At this time, the register value r_DebugLH0_en is at the high level, and the register value r_DebugLH1_en is at the low level. Since the input signal of the second input terminal of the NAND circuit NA1 is at the low level, the output signal of the NAND circuit NA1 is fixed at the high level. Since the input signal of the second input terminal of the NAND circuit NA2 is at the high level, the NAND circuit NA2 functions as an inverter circuit having the first input terminal as an input. In this case, since only the pMOS transistor M5 operates, the driving capability is one times the reference value.

As described above, in the present embodiment, three kinds of driving capabilities can be selected by a combination of the register values r_DebugLH0_en and r_DebugLH1_en. Therefore, according to the present embodiment, the photoelectric conversion device capable of switching the driving speed to three stages is provided.

Third Embodiment

The photoelectric conversion device according to the present embodiment will be described. Components similar to those in the first embodiment or the second embodiment are denoted by the same reference numerals, and descriptions of these components may be omitted or simplified.

Figure 7A:
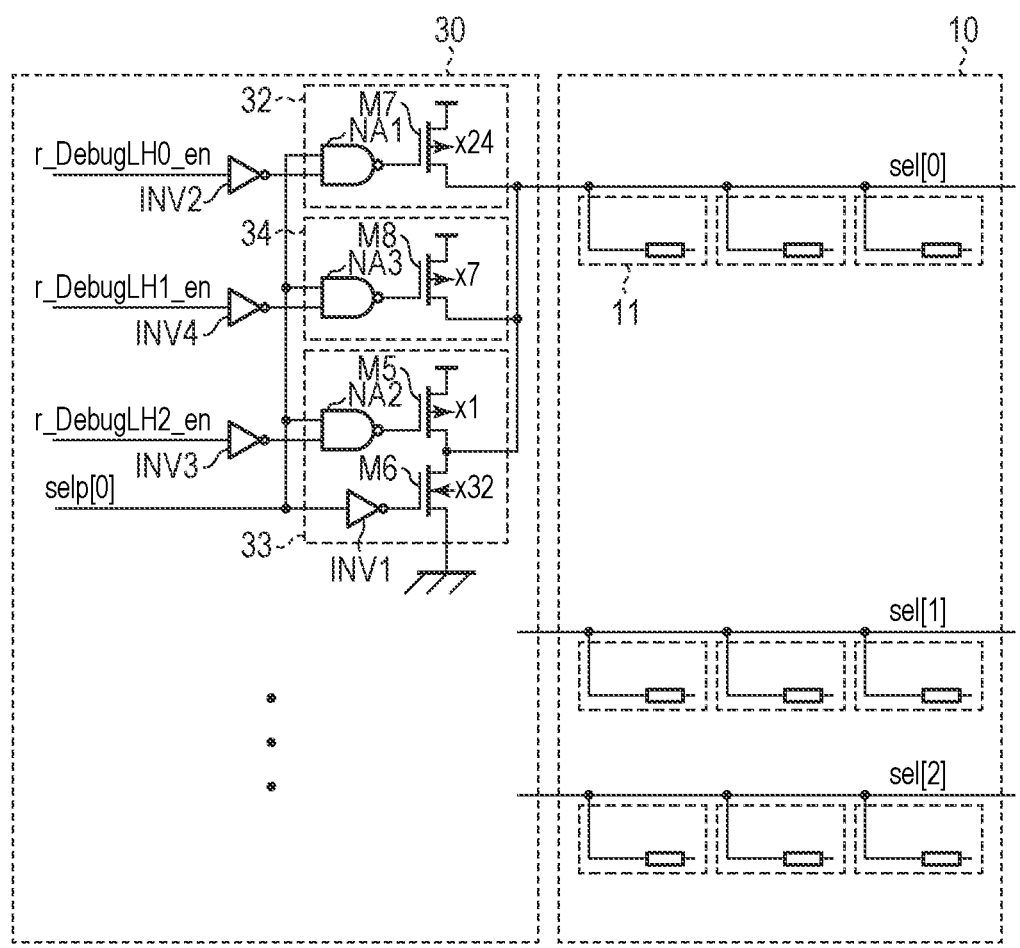
FIG. 7A is a diagram illustrating a configuration of a buffer circuit group according to a third embodiment.

FIG. 7A is a circuit diagram illustrating a configuration of the buffer circuit group 30 according to the present embodiment. FIG. 7A illustrates the pixel array 10 as a circuit around the buffer circuit group 30, and the other elements are omitted. In FIG. 7A, the configuration of the zeroth row is mainly extracted and illustrated, and the other rows are omitted or simplified.

The buffer circuit group 30 includes a first buffer circuit 33, a second buffer circuit 32, a third buffer circuit 34, and inverter circuits INV2, INV3, and INV4 as elements corresponding to the zeroth row. Since the configurations of the first buffer circuit 33 and the second buffer circuit 32 are similar to those of the second embodiment, description thereof will be omitted. Similarly to the second embodiment, a register value r_DebugLH0_en is input to the inverter circuit INV2. Unlike the second embodiment, a register value r_DebugLH2_en is input to the inverter circuit INV3.

The third buffer circuit 34 includes a pMOS transistor M8 and a NAND circuit NA3. The control line se1p[0] is connected to a first input terminal of the NAND circuit NA3. A register value r_DebugLH1_en is input from the control circuit 60 to an input terminal of the inverter circuit INV4. An output terminal of the inverter circuit INV4 is connected to a second input terminal of the NAND circuit NA3. An output terminal of the NAND circuit NA3 is connected to the gate of the pMOS transistor M8. The source of the pMOS transistor M8 is connected to a power supply voltage node to which the voltage VDD is supplied. The drain of the pMOS transistor M8 is connected to the control line sel [0].

As illustrated in FIG. 7A, the driving capability of the pMOS transistor M5 is one times the reference value, that is, the same as the reference value. The driving capability of the nMOS transistor M6 is 32 times the reference value. The driving capability of the pMOS transistor M7 is 24 times the reference value. The driving capability of the pMOS transistor M8 is seven times the reference value.

FIG. 7B is a table illustrating operation settings of the buffer circuit group 30 of the present embodiment. FIG. 7B illustrates the levels of the register values r_DebugLH0_en, r_DebugLH1_en, and r_DebugLH2_en and the driving capabilities in the seven settings S21 to S27. "0" in the columns of the register values r_DebugLH0_en, r_DebugLH1_en, and r_DebugLH2_en indicates the low level, and "1" indicates the high level.

Since the operation in each setting is substantially the same as that described in the second embodiment, a description thereof will be omitted. In the seven settings S21 to S27, the driving capabilities are 32 times, 31 times, 25 times, 24 times, eight times, seven times, and one times the reference value, respectively.

As described above, in the present embodiment, seven kinds of driving capabilities can be selected by a combination of the register values r_DebugLH0_en, r_DebugLH1_en, and r_DebugLH2_en. Therefore, according to the present embodiment, the photoelectric conversion device capable of switching the driving speed to seven stages is provided.

Fourth Embodiment

The photoelectric conversion device according to the present embodiment will be described. Components similar to those in the first to third embodiments are denoted by the same reference numerals, and descriptions of these components may be omitted or simplified.

Figure 8A:
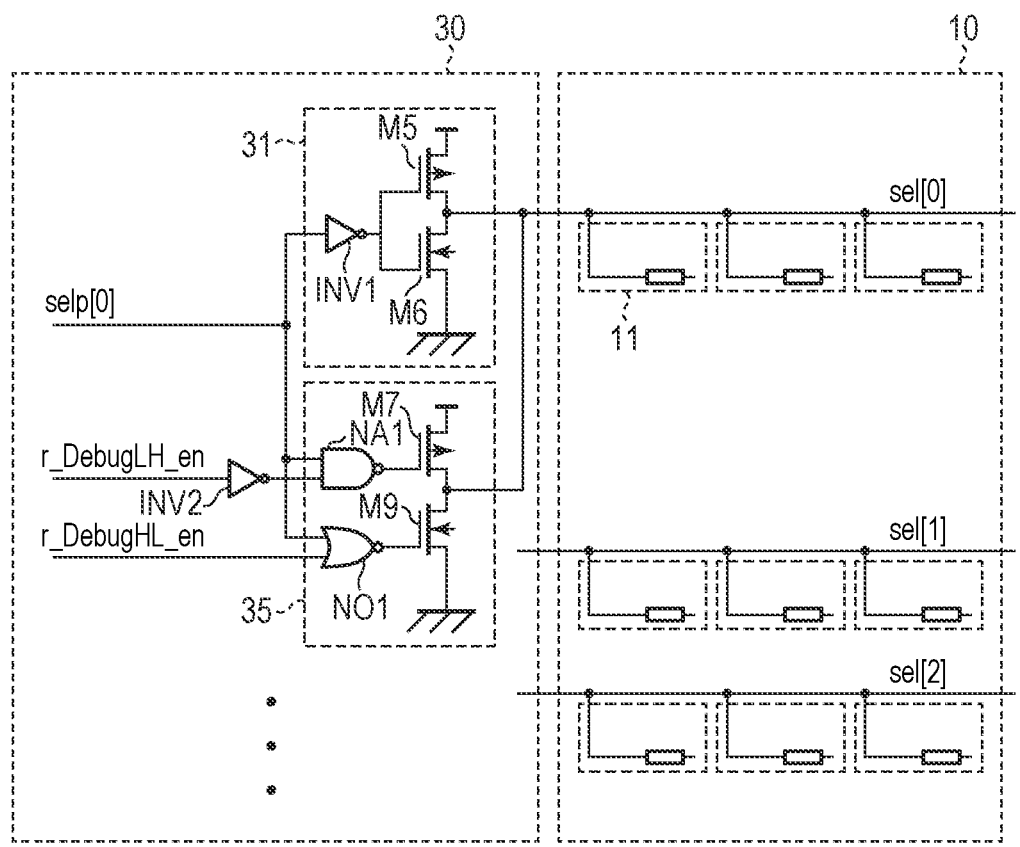
FIG. 8A is a diagram illustrating a configuration of a buffer circuit group according to a fourth embodiment.

FIG. 8A is a circuit diagram illustrating a configuration of the buffer circuit group 30 according to the present embodiment. FIG. 8A illustrates the pixel array 10 as a circuit around the buffer circuit group 30, and the other elements are omitted. In FIG. 8A, the configuration of the zeroth row is mainly extracted and illustrated, and the other rows are omitted or simplified.

The buffer circuit group 30 includes a first buffer circuit 31, a second buffer circuit 35, and an inverter circuit INV2 as elements corresponding to the zeroth row. Since the configuration of the first buffer circuit 31 is similar to that of the first embodiment, description thereof will be omitted.

The second buffer circuit 35 includes a pMOS transistor M7, an nMOS transistor M9 (fourth MOS transistor), a NAND circuit NA1, and a NOR circuit NO1. The control line sel1p[0] is connected to a first input terminal of the NAND circuit NA1 and a first input terminal of the NOR circuit NO1. A register value r_DebugLH_en is input from the control circuit 60 to an input terminal of the inverter circuit INV2. An output terminal of the inverter circuit INV2 is connected to a second input terminal of the NAND circuit NA1. An output terminal of the NAND circuit NA1 is connected to the gate of the pMOS transistor M7. The source of the pMOS transistor M7 is connected to a power supply voltage node to which the voltage VDD is supplied. A register value r_DebugHL_en is input from the control circuit 60 to a second input terminal of the NOR circuit NO1. An output terminal of the NOR circuit NO1 is connected to the gate of the nMOS transistor M9. The drain (first main electrode) of the pMOS transistor M7 and the drain of the nMOS transistor M9 are connected to the control line sel [0]. The source of the nMOS transistor M9 is connected to a ground node.

FIG. 8B is a table illustrating operation settings of the buffer circuit group 30 of the present embodiment. FIG. 8B illustrates the levels of the register values r_DebugLH_en and r_DebugHL_en and the transition speed of the potential in the four settings S31 to S34. "0" in the columns of register values r_DebugLH_en and r_DebugHL_en indicates the low level, and "1" indicates the high level. The column "L→H" indicates the transition speed of the potential when the control signal φsel transitions from the low level to the high level. The column "H→L" indicates the transition speed of the potential when the potential of the control signal φsel transitions from the high level to the low level.

The setting S31 illustrated in FIG. 8B is a default setting, and both register values r_DebugLH_en and r_DebugHL_en are at the low level. Since the input signal of the second input terminal of the NAND circuit NA1 is at the high level, the NAND circuit NA1 functions as an inverter circuit having the first input terminal as an input. Since the input signal of the second input terminal of the NOR circuit NO1 is at the low level, the NOR circuit NO1 functions as an inverter circuit having the first input terminal as an input. In this case, since both the pMOS transistor M5 and the pMOS transistor M7 operate in parallel, the transition speed of the potential when the potential of the control signal φsel transitions from the low level to the high level is fast. Since both the nMOS transistor M6 and the nMOS transistor M9 operate in parallel, the transition speed of the potential when the potential of the control signal φsel transitions from the high level to the low level is also fast.

The setting S32 illustrated in FIG. 8B is a setting for slowing down the transition speed from the low level to the high level. At this time, the register value r_DebugLH_en is at the high level, and the register value r_DebugHL_en is at the low level. Since the input signal of the second input terminal of the NAND circuit NA1 is at the low level, the output signal of the NAND circuit NA1 is fixed at the high level. Since the input signal of the second input terminal of the NOR circuit NO1 is at the low level, the NOR circuit NO1 functions as an inverter circuit having the first input terminal as an input. In this case, since the pMOS transistor M7 does not contribute to the driving capability, the transition speed of the potential when the potential of the control signal φsel transitions from the low level to the high level is slow. On the other hand, since both the nMOS transistor M6 and the nMOS transistor M9 operate in parallel, the transition speed of the potential when the potential of the control signal φsel transitions from the high level to the low level is fast.

The setting S33 illustrated in FIG. 8B is a setting for slowing down the transition speed from the high level to the low level. At this time, the register value r_DebugLH_en is at the low level, and the register value r_DebugHL_en is at the high level. Since the input signal of the second input terminal of the NAND circuit NA1 is at the high level, the NAND circuit NA1 functions as an inverter circuit having the first input terminal as an input. Since the input signal of the second input terminal of the NOR circuit NO1 is at the high level, the output signal of the NOR circuit NO1 is fixed at the low level. In this case, since both the pMOS transistor M5 and the pMOS transistor M7 operate in parallel, the transition speed of the potential when the potential of the control signal φsel transitions from the low level to the high level is fast. On the other hand, since the nMOS transistor M9 does not contribute to the driving capability, the transition speed of the potential when the potential of the control signal φsel transitions from the high level to the low level is slow.

In the setting S34 illustrated in FIG. 8B is a setting for slowing down both the transition speed from the low level to the high level and the transition speed from the high level to the low level. At this time, both the register values r_DebugLH_en and r_DebugHL_en are the high level. Since the input signal of the second input terminal of the NAND circuit NA1 is at the low level, the output signal of the NAND circuit NA1 is fixed at the high level. Since the input signal of the second input terminal of the NOR circuit NO1 is at the high level, the output signal of the NOR circuit NO1 is fixed at the low level. In this case, since neither the pMOS transistor M7 nor the nMOS transistor M9 contributes to the driving capability, the transition speed of the potential of the control signal φsel is slow both in the case of the transition from the low level to the high level and in the case of the transition from the high level to the low level.

As described above, in the present embodiment, the pMOS transistor M7 and the nMOS transistor M9 can be individually controlled by a combination of the register values r_DebugLH_en and r_DebugHL_en. Therefore, according to the present embodiment, there is provided a photoelectric conversion device capable of switching not only the transition speed when the potential of the control signal φsel1 transitions from the low level to the high level but also the transition speed when the potential of the control signal φsel1 transitions from the high level to the low level.

Fifth Embodiment

The photoelectric conversion device according to the present embodiment will be described. Components similar to those in the first to fourth embodiments are denoted by the same reference numerals, and descriptions of these components may be omitted or simplified.

Figure 9A:
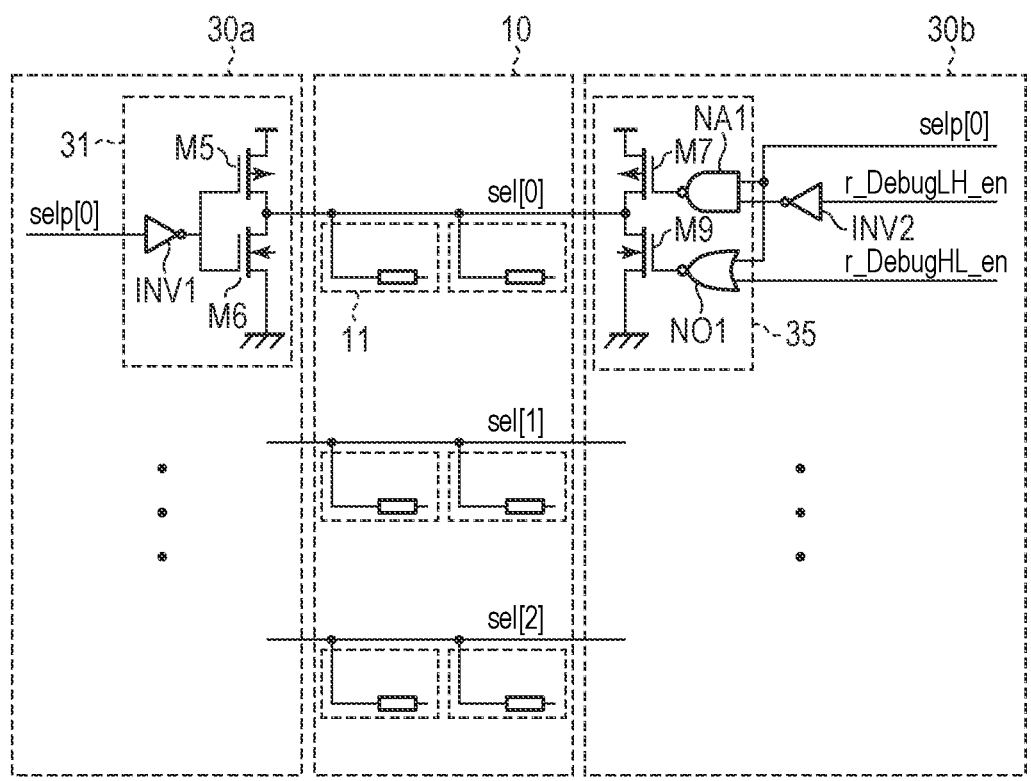
FIG. 9A is a diagram illustrating a configuration of a buffer circuit group according to a fifth embodiment.

The photoelectric conversion device of the present embodiment includes two buffer circuit groups 30a and 30b. FIG. 9A is a circuit diagram illustrating a configuration of the buffer circuit groups 30a and 30b according to the present embodiment. FIG. 9A illustrates the pixel array 10 as a circuit around the buffer circuit groups 30a and 30b, and the other elements are omitted. In FIG. 9A, the configuration of the zeroth row is mainly extracted and illustrated, and the other rows are omitted or simplified.

In the present embodiment, the buffer circuit group 30a is arranged at the left side of the pixel array 10, and the buffer circuit group 30b is arranged at the right side of the pixel array 10. In other words, the buffer circuit groups 30a and 30b are arranged at both sides of the pixel array 10 so as to sandwich the pixel array 10. The buffer circuit group 30a includes a first buffer circuit 31, and the buffer circuit group 30b includes a second buffer circuit 35 and an inverter circuit INV2. The circuit configuration and the connection relationship of the first buffer circuit 31, the second buffer circuit 35, and the inverter circuit INV2 are the same as those of the fourth embodiment except that they are divided at both sides of the pixel array 10, and thus description thereof is omitted.

FIG. 9B is a table illustrating operation settings of the buffer circuit groups 30a and 30b according to the present embodiment. Since the contents of FIG. 9B are the same as those of FIG. 8B, description thereof will be omitted. According to the present embodiment, similarly to the fourth embodiment, there is provided a photoelectric conversion device capable of switching not only the transition speed when the potential of the control signal φsel1 transitions from the low level to the high level but also the transition speed when the potential of the control signal φsel1 transitions from the high level to the low level.

Further, in the photoelectric conversion device of the present embodiment, since the two buffer circuit groups 30a and 30b are divided at both sides of the pixel array 10, an abnormal portion may be found in the shipping test. For example, in any of the settings S32, S33, and S34 in FIG. 9B, when an abnormality is found in pixels on the left side from a certain pixel 11 in the pixel array, it is highly likely that an abnormality such as an increase in resistance has occurred in the vicinity of the certain pixel. As described above, in the photoelectric conversion device of the present embodiment, it is possible to find an abnormal portion more effectively in the shipping test.

Sixth Embodiment

In the present embodiment, an example in which a configuration of the buffer circuit group 30 described in the first embodiment is applied to a display device will be described. The display device is typically an organic light emitting display device using an organic light emitting diode (OLED) containing a light emitting organic material. However, the display device may include an inorganic light emitting diode. Further, a display device may be more generally referred to as a semiconductor device.

FIG. 10 is a diagram illustrating a configuration of the buffer circuit group 30 in the display device according to the sixth embodiment. In FIG. 10, components similar to those in FIG. 3 are denoted by the same reference numerals, and descriptions of these components may be omitted or simplified.

The display device includes a pixel array 16, a vertical scanning circuit 20, a buffer circuit group 30, and a writing circuit 56. Further, the display device may include a control circuit (not illustrated) that controls the vertical scanning circuit 20, the buffer circuit group 30, and the writing circuit 56. As in the first embodiment, the buffer circuit group 30 includes a plurality of first buffer circuits 31, a plurality of second buffer circuits 32, and an inverter circuit INV2 as in the case of FIG. 3. Since the configurations of the vertical scanning circuit 20 and the buffer circuit group 30 are the same as those in FIG. 3, description thereof will be omitted. Circuits included in the display device can be formed in one or more semiconductor substrates.

The pixel array 16 includes a plurality of pixels 17 arranged in a plurality of rows and a plurality of columns. Each of the plurality of pixels 17 emits light at a luminance corresponding to an applied current. A color filter may be arranged on the pixel 17. In FIG. 10, only three rows and three columns of pixels 17 are illustrated, but in practice, the pixels 17 may be arranged in several thousands of rows and several thousands of columns.

The writing circuit 56 outputs a pixel signal corresponding to the luminance of corresponding pixel to each of the plurality of pixels 17. The writing circuit 56 includes column circuits corresponding to respective columns. The column circuit includes a digital-to-analog conversion circuit, a column driving circuit, and the like.

Figure 11:
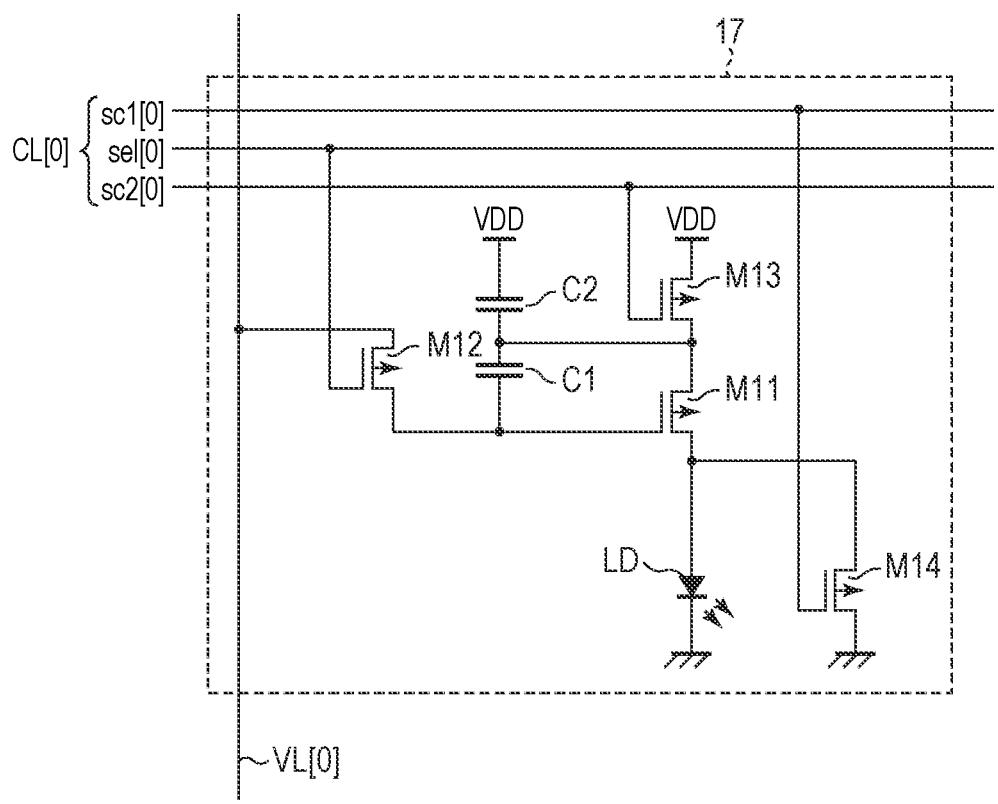
FIG. 11 is a circuit diagram of a pixel according to the sixth embodiment.

FIG. 11 is a circuit diagram of the pixel 17 according to the present embodiment. FIG. 11 illustrates one pixel 17 in the pixel array 16. It is assumed that the pixels 17 illustrated in FIG. 11 is a pixel 17 of the zeroth row and the zeroth column. All the transistors included in the pixel 17 are pMOS transistors, but may be nMOS transistors.

The pixel 17 includes a light emitting unit LD, a driving transistor M11, a selection transistor M12, switching transistors M13 and M14, and capacitance elements C1 and C2. The light emitting unit LD is, for example, a light emitting diode such as an OLED. The cathode of the light emitting unit LD is connected to a ground node, and the anode of the light emitting unit LD is connected to the drain of the driving transistor M11 and the source of the switching transistor M14. The drain of the switching transistor M14 is connected to a ground node.

The gate of the driving transistor M11 is connected to the drain of the selection transistor M12 and a first terminal of the capacitor element C1. The source of the selection transistor M12 is connected to the vertical signal line VL. The source of the driving transistor M11 is connected to the drain of the switching transistor M13, a second terminal of the capacitor element C1, and a first terminal of the capacitor element C2. A second terminal of the capacitor element C2 and the source of the switching transistor M13 are connected to a power supply voltage node to which the voltage VDD is supplied.

Note that the term "source" or "drain" of the MOS transistor may vary depending on the conductivity type of the transistor or the function of interest. Some or all of names of a source and a drain used in this embodiment are sometimes referred to by opposite names.

The control line CL[0] includes a control line se1 [0] connected to the gate of the selection transistor M12, a control line sc2 [0] connected to the gate of the switching transistor M13, and a control line sc1 [0] connected to the gate of the switching transistor M14. Control signals are supplied from the vertical scanning circuit 20 to the control lines se1 [0], sc1 [0], and sc2 [0] via the buffer circuit group 30.

The driving transistor M11 supplies current to be applied to the light emitting unit LD. To the gate of the switching transistor M13, a signal for switching on/off of light emission from the light emitting unit LD is input from the control line sc2 [0].

A control signal for selecting a row in which an image signal is written is input to the gate of the selection transistor M12 from the control line se1 [0]. By this operation, the image signal corresponding to the luminance information is sampled from the vertical signal line VL[0] to the gate electrode of the driving transistor M11.

A signal for controlling the voltage of the anode of the light emitting unit LD is input from the control line sc1 [0] to the gate of the switching transistor M14 during a calibration period. In the calibration period, the reference voltage is sampled from the vertical signal line VL[0] to the gate electrode of the driving transistor M11. Thus, the variation in the threshold voltage of the driving transistor M11 of each of the plurality of pixels 17 can be corrected, and the variation in luminance among the plurality of pixels 17 caused by the variation in the threshold voltage can be reduced.

As in the first embodiment, the display device of the present embodiment includes a buffer circuit group 30 capable of switching the driving capability. Therefore, according to the present embodiment, a display device capable of switching the driving speed is provided. The switching of the driving speed can be used for at least one of the applications described in the first embodiment. For example, as described in the first embodiment, by reducing the driving speed during the shipping test of the display device, the enhanced shipping test can be performed, and a process abnormality in the mass production process of the display device can be found early.

Seventh Embodiment

Figure 12:
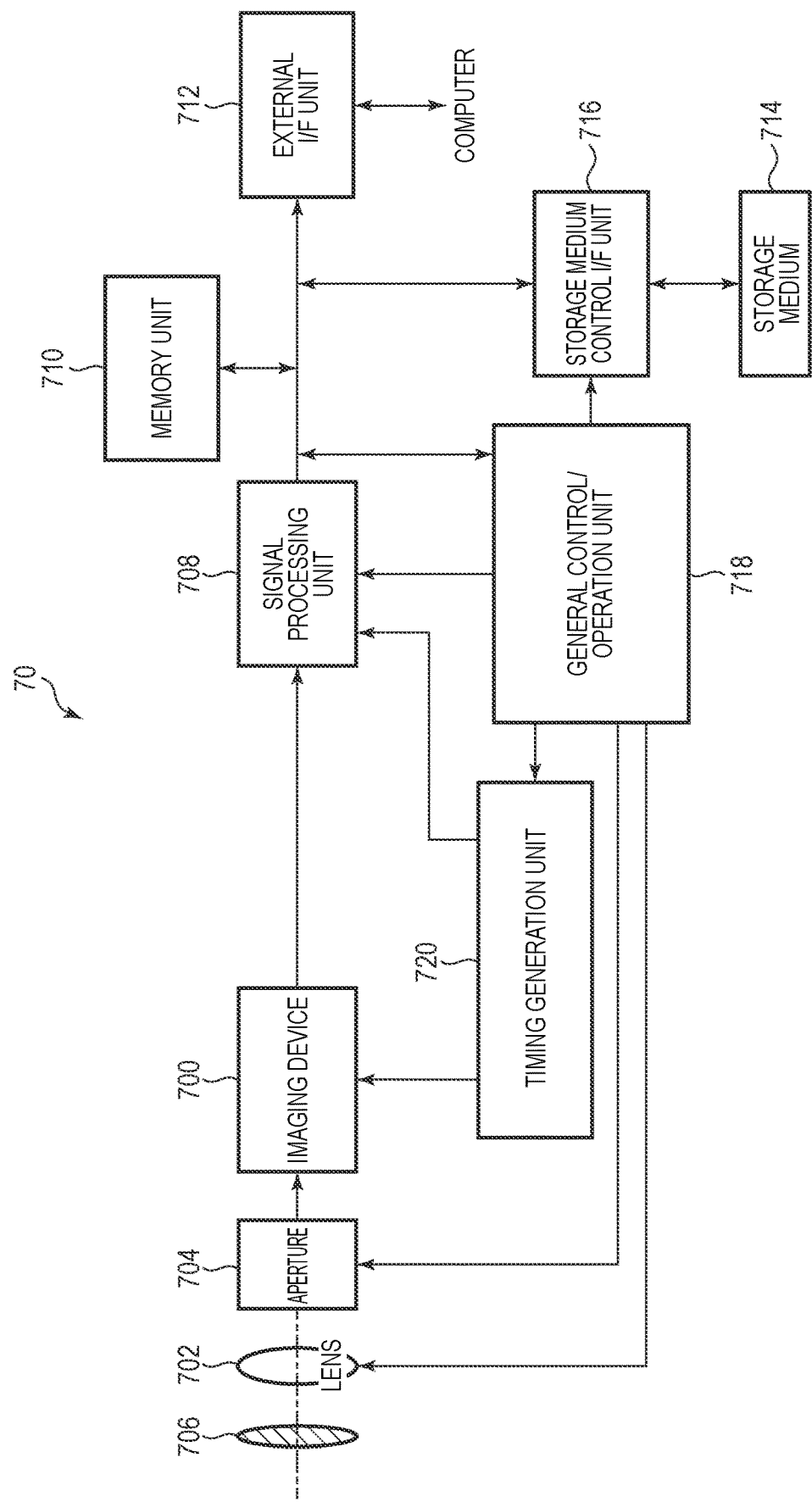
FIG. 12 is a block diagram of equipment according to a seventh embodiment.

The photoelectric conversion device of the above-described embodiments can be applied to various equipment. Examples of the equipment include a digital still camera, a digital camcorder, a camera head, a copying machine, a facsimile, a mobile phone, a vehicle-mounted camera, an observation satellite, and a surveillance camera. FIG. 12 is a block diagram of a digital still camera as an example of equipment.

The equipment 70 illustrated in FIG. 12 includes a barrier 706, a lens 702, an aperture 704, and an imaging device 700 (an example of the photoelectric conversion device). The equipment 70 further includes a signal processing unit (processing device) 708, a timing generation unit 720, a general control/operation unit 718 (control device), a memory unit 710 (storage device), a storage medium control I/F unit 716, a storage medium 714, and an external I/F unit 712. At least one of the barrier 706, the lens 702, and the aperture 704 is an optical device corresponding to the equipment. The barrier 706 protects the lens 702, and the lens 702 forms an optical image of an object on the imaging device 700. The aperture 704 varies the amount of light passing through the lens 702. The imaging device 700 is configured as in the above-described embodiments, and converts an optical image formed by the lens 702 into image data (image signal). The signal processing unit 708 performs various corrections, data compression, and the like on the imaging data output from the imaging device 700. The timing generation unit 720 outputs various timing signals to the imaging device 700 and the signal processing unit 708. The general control/operation unit 718 controls the entire digital still camera, and the memory unit 710 temporarily stores image data. The storage medium control I/F unit 716 is an interface for storing or reading image data on the storage medium 714, and the storage medium 714 is a detachable storage medium such as a semiconductor memory for storing or reading captured image data. The external I/F unit 712 is an interface for communicating with an external computer or the like. The timing signal or the like may be input from the outside of the equipment. The equipment 70 may further include a display device (a monitor, an electronic view finder, or the like) for displaying information obtained by the photoelectric conversion device. The equipment includes at least a photoelectric conversion device. Further, the equipment 70 includes at least one of an optical device, a control device, a processing device, a display device, a storage device, and a mechanical device that operates based on information obtained by the photoelectric conversion device. The mechanical device is a movable portion (for example, a robot arm) that receives a signal from the photoelectric conversion device for operation.

Each pixel may include a plurality of photoelectric conversion units (a first photoelectric conversion unit and a second photoelectric conversion unit). The signal processing unit 708 may be configured to process a pixel signal based on charges generated in the first photoelectric conversion unit and a pixel signal based on charges generated in the second photoelectric conversion unit, and acquire distance information from the imaging device 700 to an object.

Eighth Embodiment

Figure 13A:
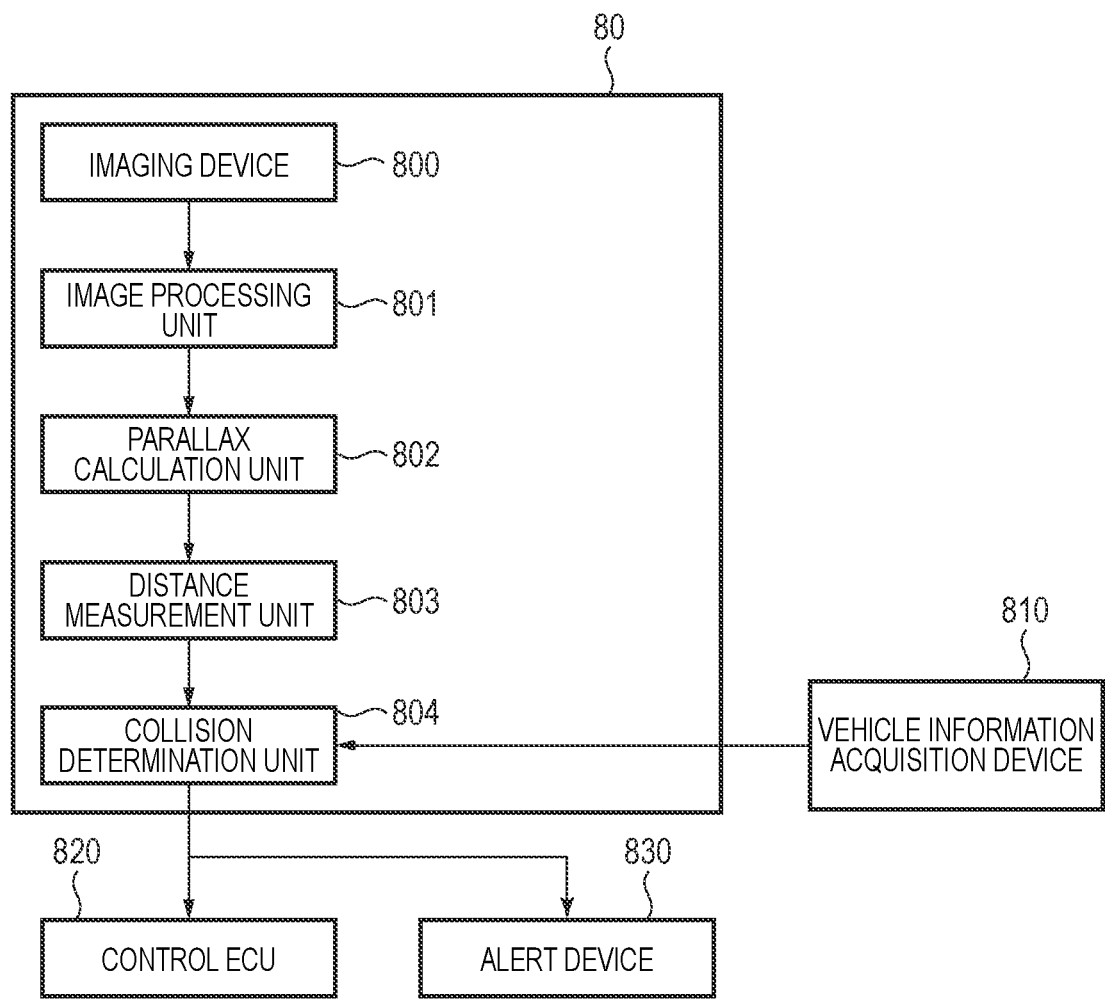
FIG. 13A and FIG. 13B are block diagrams of equipment according to an eighth embodiment.
Figure 13B:
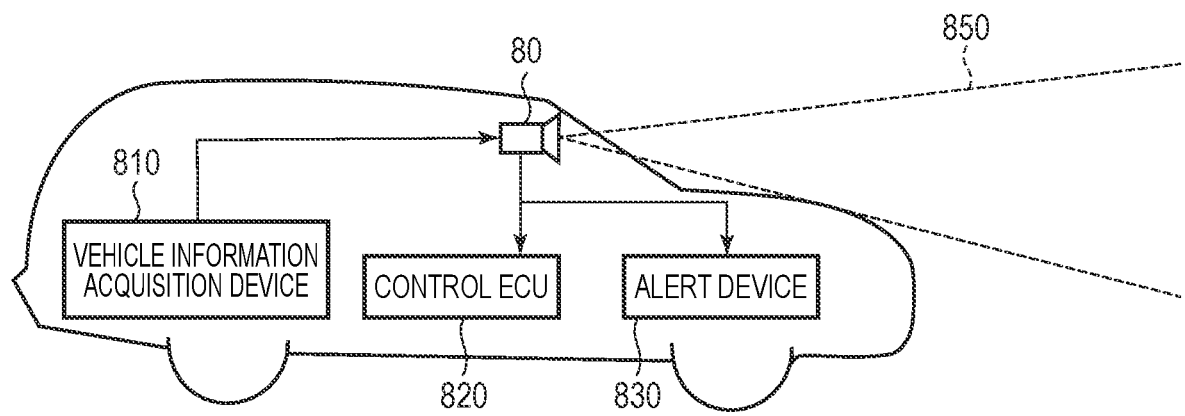

FIGS. 13A and 13B are block diagrams of equipment relating to the vehicle-mounted camera according to the present embodiment. The equipment 80 includes an imaging device 800 (an example of the photoelectric conversion device) of the above-described embodiments and a signal processing device (processing device) that processes a signal from the imaging device 800. The equipment 80 includes an image processing unit 801 that performs image processing on a plurality of pieces of image data acquired by the imaging device 800, and a parallax calculation unit 802 that calculates parallax (phase difference of parallax images) from the plurality of pieces of image data acquired by the equipment 80. The equipment 80 includes a distance measurement unit 803 that calculates a distance to an object based on the calculated parallax, and a collision determination unit 804 that determines whether or not there is a possibility of collision based on the calculated distance. Here, the parallax calculation unit 802 and the distance measurement unit 803 are examples of a distance information acquisition unit that acquires distance information to the object. That is, the distance information is information on a parallax, a defocus amount, a distance to the object, and the like. The collision determination unit 804 may determine the possibility of collision using any of these pieces of distance information. The distance information acquisition unit may be realized by dedicatedly designed hardware or software modules. Further, it may be realized by a field programmable gate array (FPGA), an application specific integrated circuit (ASIC) or a combination thereof.

The equipment 80 is connected to the vehicle information acquisition device 810, and can acquire vehicle information such as a vehicle speed, a yaw rate, and a steering angle. Further, the equipment 80 is connected to a control ECU 820 which is a control device that outputs a control signal for generating a braking force to the vehicle based on the determination result of the collision determination unit 804. The equipment 80 is also connected to an alert device 830 that issues an alert to the driver based on the determination result of the collision determination unit 804. For example, when the collision possibility is high as the determination result of the collision determination unit 804, the control ECU 820 performs vehicle control to avoid collision or reduce damage by braking, returning an accelerator, suppressing engine output, or the like. The alert device 830 alerts the user by sounding an alarm such as a sound, displaying alert information on a screen of a car navigation system or the like, or giving vibration to a seat belt or a steering wheel. The equipment 80 functions as a control unit that controls the operation of controlling the vehicle as described above.

In the present embodiment, an image of the periphery of the vehicle, for example, the front or the rear is captured by the equipment 80. FIG. 13B illustrates equipment in a case where an image is captured in front of the vehicle (image capturing range 850). The vehicle information acquisition device 810 as the imaging control unit sends an instruction to the equipment 80 or the imaging device 800 to perform the imaging operation. With such a configuration, the accuracy of distance measurement can be further improved.

Although the example of control for avoiding a collision to another vehicle has been described above, the embodiment is applicable to automatic driving control for following another vehicle, automatic driving control for not going out of a traffic lane, or the like. Furthermore, the equipment is not limited to a vehicle such as an automobile and can be applied to a movable body (movable apparatus) such as a ship, an airplane, a satellite, an industrial robot and a consumer use robot, or the like, for example. In addition, the equipment can be widely applied to equipment which utilizes object recognition or biometric authentication, such as an intelligent transportation system (ITS), a surveillance system, or the like without being limited to movable bodies.

Modified Embodiments

The present invention is not limited to the above-described embodiments, and various modifications are possible. For example, an example in which some of the configurations of any of the embodiments are added to other embodiments or an example in which some of the configurations of any of the embodiments are replaced with some of the configurations of other embodiments is also an embodiment of the present invention.

The disclosure of this specification includes a complementary set of the concepts described in this specification. That is, for example, if a description of "A is B" (A=B) is provided in this specification, this specification is intended to disclose or suggest that "A is not B" even if a description of "A is not B" (A≠B) is omitted. This is because it is assumed that "A is not B" is considered when "A is B" is described.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-009442, filed Jan. 25, 2022, which is hereby incorporated by reference herein in its entirety.

What is claimed is:

1. A semiconductor device comprising:
   a first buffer circuit and a second buffer circuit each configured to output a control signal to one control line based on an input from a signal output circuit; and
   an element configured to receive the control signal transmitted through the one control line,
   wherein the second buffer circuit is switchable between electrical connection and electrical disconnection to the one control line, and
   wherein a first mode in which a current is supplied to the one control line with a first driving capability by the first buffer circuit, and a second mode in which a current is supplied to the one control line with a second driving capability greater than the first driving capability by connecting both the first buffer circuit and the second buffer circuit to the one control line, are switchable.

2. The semiconductor device according to claim 1, wherein the first buffer circuit is switchable between electrical connection and electrical disconnection to the one control line.

3. The semiconductor device according to claim 1, wherein a driving capability of the first buffer circuit and a driving capability of the second buffer circuit are different from each other.

4. The semiconductor device according to claim 3, wherein the second driving capability is 10 times or more than the first driving capability.

5. The semiconductor device according to claim 1, wherein an operation of a shipping test of the semiconductor device is performed in the first mode.

6. The semiconductor device according to claim 1,
wherein the second buffer circuit includes a first MOS transistor of a first conductivity type, and
wherein a first main electrode of the first MOS transistor is electrically connected to the one control line.

7. The semiconductor device according to claim 6,
wherein the first buffer circuit includes a second MOS transistor of the first conductivity type and a third MOS transistor of a second conductivity type, and
wherein a first main electrode of the second MOS transistor and a first main electrode of the third MOS transistor are electrically connected to the one control line.

8. The semiconductor device according to claim 7, wherein a second main electrode of the first MOS transistor and a second main electrode of the second MOS transistor are electrically connected to each other.

9. The semiconductor device according to claim 8, wherein the second main electrode of the first MOS transistor and the second main electrode of the second MOS transistor are connected to a wiring having a power supply voltage.

10. The semiconductor device according to claim 6,
wherein the second buffer circuit includes a fourth MOS transistor of a second conductivity type, and
wherein a first main electrode of the fourth MOS transistor is electrically connected to the one control line.

11. The semiconductor device according to claim 1 further comprising a third buffer circuit configured to output the control signal to the one control line based on the input from the signal output circuit,
wherein the third buffer circuit is switchable between electrical connection and electrical disconnection to the one control line.

12. The semiconductor device according to claim 1 comprising a plurality of the elements,
wherein the one control line is commonly connected to the plurality of elements.

13. The semiconductor device according to claim 12, wherein the plurality of elements is arranged between the first buffer circuit and the second buffer circuit.

14. A photodetection device constituted by the semiconductor device according to claim 1, wherein the element includes a photodiode.

15. Equipment comprising:
the photodetection device according to claim 14; and
at least any one of:
an optical device adapted for the photodetection device,
a control device configured to control the photodetection device,
a processing device configured to process a signal output from the photodetection device,
a display device configured to display information obtained by the photodetection device,
a storage device configured to store information obtained by the photodetection device, and
a mechanical device configured to operate based on information obtained by the photodetection device.

16. The equipment according to claim 15, wherein the processing device processes image signals generated by a plurality of photoelectric conversion units, respectively, and acquires distance information on a distance from the photodetection device to an object.

17. A display device constituted by the semiconductor device according to claim 1, wherein the element includes a light emitting diode.

* * * * *